United States Patent [19]

Nomura et al.

[11] 4,452,935

[45] Jun. 5, 1984

[54] INTERLAYER FILM FOR LAMINATED GLASS

[75] Inventors: Shigeru Nomura, Itami; Masashi Miyakawa, Ichikawa; Ken-ichi Asahina, Shiga, all of Japan

[73] Assignee: Sekisui Kagaku Kogyo Kabushiki Kaisha, Osaka, Japan

[21] Appl. No.: 382,359

[22] Filed: May 26, 1982

[30] Foreign Application Priority Data

Jun. 1, 1981 [JP] Japan ............................ 56-84111
Aug. 14, 1981 [JP] Japan ............................ 56-128038

[51] Int. Cl.$^3$ .............................................. C08K 5/11
[52] U.S. Cl. ................................... 524/290; 428/437; 524/308; 525/61
[58] Field of Search ............... 524/290, 308; 428/437; 525/61

[56] References Cited

U.S. PATENT DOCUMENTS

| | | | |
|---|---|---|---|
| 2,517,218 | 8/1950 | Lawrence | 524/308 |
| 3,838,091 | 9/1974 | Kanno | 524/143 |
| 3,841,890 | 10/1974 | Coaker | 524/145 |
| 3,998,792 | 12/1976 | Hermann | 525/61 |
| 4,144,217 | 3/1979 | Snelgrove | 428/437 |
| 4,161,565 | 7/1979 | Hermann | 428/437 |
| 4,205,146 | 5/1980 | Hermann | 525/61 |
| 4,243,572 | 1/1981 | Dages | 428/437 |
| 4,292,372 | 9/1981 | Moynihan | 524/308 |

FOREIGN PATENT DOCUMENTS

56-92142 7/1981 Japan .

*Primary Examiner*—Paul R. Michl
*Attorney, Agent, or Firm*—Wenderoth, Lind & Ponack

[57] ABSTRACT

An interlayer film for a laminated glass, which comprises polyvinyl butyral and a plasticizer and has a T peel strength at 20° C. of not more than 0.5 kg/cm, said polyvinyl butyral satisfying the following expression $$Y \geq -3X + 486$$

wherein X is the degree of butyralization in mole % and Y is the half-value width in cm$^{-1}$ of hydroxyl absorption in the infrared absorption spectrum of the polyvinyl butyral in which the ordinate represents the transmittance and the abscissa represents the wave number.

8 Claims, 2 Drawing Figures

INTERLAYER FILM FOR LAMINATED GLASS

FIELD OF THE INVENTION

This invention relates to an interlayer film for laminated glass which has reduced adhesion to itself, and can give a laminated glass of improved impact strength when used as an interlayer between sheets of glass.

This invention also relates to a wound or stacked structure of an interlayer film having fine raised and depressed portions on its surface, which is suitable as a dustless interlayer of a laminated glass. More specifically, it pertains to a wound or stacked form of an interlayer film which does not substantially adhere to itself during storage or transportation at ambient temperature even in the absence of a powdery adhesion-preventing agent.

BACKGROUND OF THE INVENTION

It is widely known to use a film of plasticized polyvinyl butyral obtained by adding a plasticizer to polyvinyl butyral as an interlayer of a laminated glass. The plasticized polyvinyl butyral film has excellent adhesion, light stability, transparency and low-temperature flexibility, and finds extensive use as an interlayer film for laminated glasses used in automobiles, aircraft and buildings. In many cases, after extrusion in sheet form, it is wound up on a paper tube, etc. and stored or transported as such.

Conventional interlayer films for laminated glasses have strong adhesion at their surfaces. When the film as formed is wound up or when a wound structure of the film obtained by winding is stored or transported at ambient temperature, the film adheres to itself (this property is referred to in this application as the self-adhering property), and the film undergoes deformation during unwinding and becomes useless and in an extreme case, is broken. Attempts have been made to prevent such adhesion by spraying a powdery adhesion-preventing agent such as sodium bicarbonate on to the surface of the film, or cooling the interlayer film to a temperature of 10° C. or less, or interposing a non-tacky film such as a polyethylene film between layers of the film. The method involving the spraying of the adhesion-preventing agent has the disadvantage that in bonding the polyvinyl butyral film to sheets of glass, the film should be subjected in advance to a washing step and a drying step to remove the adhesion-preventing agent. The cooling method requires a cooling device from immediately after the production of the film to the time of use and during packaging, transporting and storing. Furthermore, because water droplets form on the film surface when the temperature of the cooled film is returned to ordinary temperature, a step of readjusting the moisture content of the film is required immediately before use. All this will add to the cost of the film. According to the method comprising interposing the non-tacky film, dust in the air tends to adhere to the interlayer film owing to static charges generated by the use of the non-tacky film.

SUMMARY OF THE INVENTION

An object of this invention is to provide an interlayer film for a laminated glass, which has reduced self-adhering property and gives a laminated glass of improved impact strength when used as an interlayer between sheets of glass.

Another object of this invention is to provide a dustless interlayer film for a laminated glass, which does not require a powdery adhesion-preventing agent or an adhesion-preventing film, and does not substantially adhere to itself even when it is converted to a wound or stacked structure and stored or transported as such at ambient temperature.

According to this invention, there is provided an interlayer film for a laminated glass, which comprises polyvinyl butyral and a plasticizer and has a T peel strength at 20° C. of not more than 0.5 kg/cm, said polyvinyl butyral satisfying the following expression $$Y \geq -3X + 486 \tag{1}$$

wherein X is the degree of butyralization in mole% and Y is the half-value width in $cm^{-1}$ of hydroxyl absorption in the infrared absorption spectrum of the polyvinyl butyral in which the ordinate represents the transmittance and the abscissa represents the wave number.

According to this invention, there is also provided an interlayer film for a laminated glass which is obtained by forming fine raised and depressed portions on the surface of the aforesaid interlayer film and winding up or stacking the film without spraying a powdery adhesion-preventing agent on its surface so that the surface of the film makes contact with itself.

The interlayer film of this invention has the advantage that at ordinary temperature, it has no adhesion either to itself or to a glass surface, but after it has been interposed between glass sheets under heat and pressure, it has sufficient adhesion to the glass surfaces and the resulting laminated glass has improved impact strength especially at low temperatures.

The interlayer film of this invention having fine raised and depressed portions on its surface can be wound up or stacked without any adhesion-preventing agent applied to its surface, and even when it is left to stand at a relatively high ambient temperature of about 40° C. while the film makes contact with itself, it can be stored or transported without substantial adhesion of the film to itself.

BRIEF DESCRIPTION OF THE ACCOMPANYING DRAWINGS

FIG. 1 is a chart showing one example of the infrared absorption spectrum of polyvinyl butyral used in the interlayer film of this invention, and FIG. 2 is a sectional view of a film surface for illustrating the 10-point average surface roughness of the film.

DETAILED DESCRIPTION OF THE INVENTION

Figure 1:
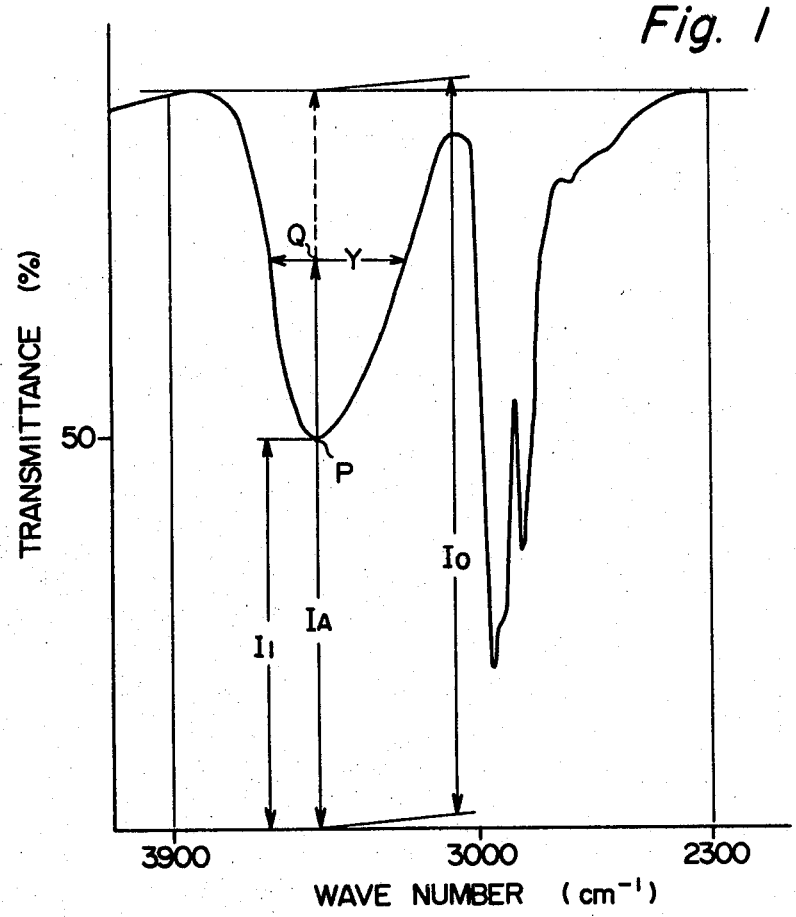

In the present invention, the half-value width of hydroxyl absorption in the infrared absorption spectrum of polyvinyl butyral is defined as follows: In the infrared absorption spectrum of polyvinyl butyral shown in FIG. 1 in which the ordinate represents the transmittance (%) and the abscissa, the wave number ($cm^{-1}$), a base line is drawn by connecting the transmittances at a wave number of 3900 $cm^{-1}$ and 2300 $cm^{-1}$ at which no infrared absorption occurs. Now, let the distance from the abscissa (0% transmittance) to the base line through the peak P of the absorption spectrum of the hydroxyl group between 3900 $cm^{-1}$ and 2300 $cm^{-1}$ be $I_o$ and the distance from the abscissa to the peak P of the absorption spectrum of the hydroxyl group be $I_1$, then a transmittance which gives the half-value width, that is the distance $I_4$ from the abscissa, is given by the geometric mean of $I_o$ and $I_1$ ($\sqrt{I_4}=I_o \times I_1$). Then, assume a point Q whose distance from the ordinate is equal to the distance of the peak P of the absorption spectrum of the hydroxyl group from the ordinate and whose distance from the abscissa is $I_4$. The line segment Y obtained by the crossing of the line drawn parallel to the abscissa through Q as in FIG. 1 with the absorption spectrum of the hydroxyl group is the half-value width ($cm^{-1}$).

We have found that polyvinyl butyral samples having the same degree of butyralization may differ subtly from each other in the absorption band of the hydroxyl groups in their infrared absorption spectra. In other words, the half-value width of polyvinyl butyral which provides an interlayer film having reduced self-adhering property is always larger than that of polyvinyl butyral which provides an interlayer film having great self-adhering property even when these polyvinyl butyrals have the same degree of butyralization. No clear reasons has yet been able to be assigned to it. It is theorized however that polyvinyl butyral having sequentially arranged hydroxyl groups has a stronger tendency to association by hydrogen bonding than polyvinyl butyral having irregularly arranged hydroxyl groups and therefore has increased rigidity and gives an interlayer film having reduced self-adhering property, and that since the hydroxyl absorption band of the infrared absorption spectrum of the first-mentioned polyvinyl butyral contains a portion in which association by hydrogen bonding is stronger than that in the polyvinyl butyral having irregularly arranged hydroxyl groups, it expands to the low energy side, i.e. the low wave number side and makes the half-value width of the hydroxyl absorption larger.

The degree of butyralization of the polyvinyl butyral used in this invention is desirably 60 to 75 mole%. If it is lower than the specified limit, the compatibility of the polyvinyl butyral with a plasticizer is reduced. Higher degrees of butyralization give laminated glasses of degraded properties such as degraded penetration resistance.

The degree of butyralization may be measured by a known method, for example a method using hydroxylamine hydrochloride.

The polyvinyl butyral which satisfies the expression (1) given hereinabove can be obtained, for example, by a precipitation method which comprises adding butyraldehyde to an aqueous solution of polyvinyl alcohol in the presence of an acid catalyst to form a precipitate at a relatively low temperature, heating the reaction mixture, aging it at a high temperature for a long period of time, and thereafter subjecting the product in a customary manner to neutralization, washing with water and drying. Preferably, the aging of polyvinyl butyral is carried out, for example, in the presence of a perchloric acid-type compound, because it will give an interlayer film having more reduced self-adhering property. Specifically, a perchloric acid-type compound is added to an aqueous solution of polyvinyl alcohol to which a catalyst such as hydrochloric acid has been added. Then, butyraldehyde is added, and a precipitate is formed at a temperature of not more than 20° C. Examples of the perchloric acid-type compound include alkali metal salts of perchloric acid such as sodium perchlorate or potassium perchlorate and alkaline earth metal salts of perchloric acid such as magnesium perchlorate or calcium perchlorate. Sodium perchlorate is especially preferred. The perchloric acid-type compound is added usually in an amount of at least 0.2% by weight based on the final reaction system. Thereafter, the reaction mixture is heated, and maintained at a temperature of at least 30° C. usually for 1 to 15 hours to age polyvinyl butyral, which is worked up in a customary manner to obtain a dry powder. The perchloric acid-type compound may be added to the reaction system as soon as the aging is started.

The polyvinyl butyral used in this invention preferably has an average degree of polymerization of 1,000 to 3,000. If it is lower than the specified limit, the resulting interlayer film tends to have increased self-adhering property, and if it is higher than the specified limit, the viscosity of the polymer becomes higher than is necessary. In other words, in producing the polyvinyl butyral used in this invention, the starting polyvinyl alcohol preferably has an average degree of polymerization of 1,000 to 3,000.

In order to obtain polyvinyl butyral having good transparency, the polyvinyl alcohol has a saponification degree of preferably at least 95 mole%.

All plasticizers which are generally used for polyvinyl butyral can be employed in this invention, and examples include triethylene glycol di-2-ethyl butyrate, triethylene glycol di-2-ethyl hexoate, and dihexyl adipate. Interlayer films obtained by using these plasticizers have greatly reduced self-adhering property, and the resulting laminated glasses show practical impact strength over a wide temperature range. It has been found on the other hand that when the resulting laminated glass is used for a long period of time, the adhesion of the interlayer in the edge portion of the glass tends to be reduced, and in an extreme case, the film and the glass are delaminated or bubbles are formed.

Accordingly, when the service conditions of glass are severe or complete adhesion is required also at the edge portion of the laminated glass, it is preferred to use plasticizers represented by the following general formula

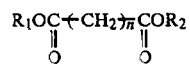

wherein $R_1$ represents an alcohol residue containing at least one ether linkage or an alkyl group having 5 to 13 carbon atoms, $R_2$ represents an alcohol residue containing at least one ether linkage, and n is an integer of 1 to 10. When $R_1$ is the alkyl group, the plasticizers become hydrophobic as the number of its carbon atoms increases beyond 13, and their compatibility with the polyvinyl butyral satisfying the expression (1) tends to be reduced. If, on the other hand, the number of its carbon atoms is less than 5, the boiling points of the plasticizers become lower, and during the long-term use of the laminated glass, such a plasticizer will vaporize from the edge portion of the interlayer film and tends to adversely affect the stability of the laminated glass.

The plasticizers of the above general formula can be obtained by esterification of dicarboxylic acids with alcohols having at least one ether linkage in the molecule or alkyl alcohols having 5 to 13 carbon atoms. Examples of suitable dicarboxylic acids are malonic acid, succinic acid, glutaric acid, adipic acid, pimelic acid, cork acid, azelaic acid and sebacic acid. Examples of suitable alcohols having at least one ether linkage in the molecule include methyl Cellosolve, ethyl Cellosolve, propyl Cellosolve, butyl Cellosolve, hexyl Cellosolve, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, 3-methoxybutanol, 3-ethoxybutanol, 3-butoxybutanol, 3-methyl-3-methoxybutanol and 3-methyl-3-ethoxybutanol. Typical examples of alkyl alcohols having 5 to 13 carbon atoms are hexyl alcohol, heptyl alcohol, octyl alcohol, 2-ethylhexyl alcohol, nonyl alcohol, decyl alcohol, undecyl alcohol and dodecyl alcohol.

Table 1 below shows typical examples of the plasticizers represented by the above-given general formula.

TABLE 1

1. 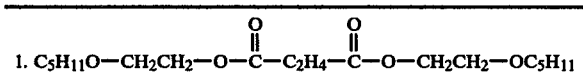

2. 

3. 

4. 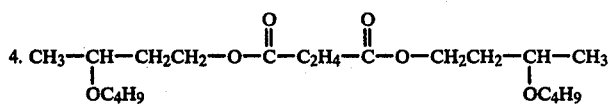

5. 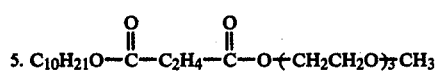

6. 

7. 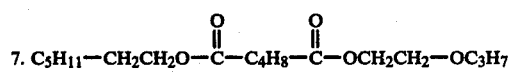

8. 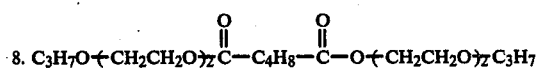

9. 

10. 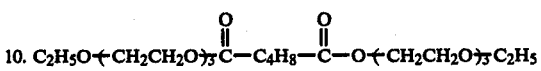

11. 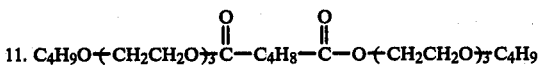

12. 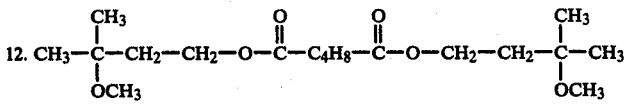

13. 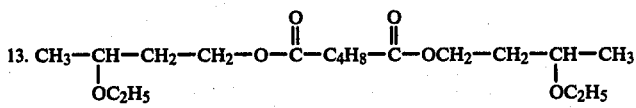

14. 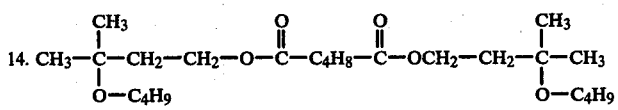

15. 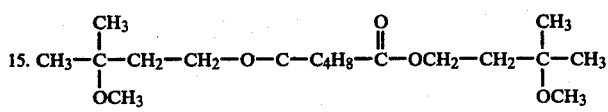

16. 

TABLE 1-continued

17. $C_{12}H_{25}O-\overset{O}{\underset{\|}{C}}-C_4H_8-\overset{O}{\underset{\|}{C}}-O-CH_2-CH_2-\overset{CH_3}{\underset{\underset{OC_2H_5}{|}}{\overset{|}{C}}}-CH_3$ 18. $C_3H_7O-CH_2CH_2-O-\overset{O}{\underset{\|}{C}}-C_6H_{12}-\overset{O}{\underset{\|}{C}}-O-CH_2CH_2-OC_3H_7$ 19. $C_4H_9O-CH_2-CH_2-O-\overset{O}{\underset{\|}{C}}-C_6H_{12}-\overset{O}{\underset{\|}{C}}-O-CH_2CH_2-OC_4H_9$ 20. $CH_3O(CH_2CH_2O)_{\overline{2}}\overset{O}{\underset{\|}{C}}-C_6H_{12}-\overset{O}{\underset{\|}{C}}-O(CH_2CH_2-O)_{\overline{2}}CH_3$ 21. $C_2H_5O(CH_2CH_2O)_{\overline{2}}\overset{O}{\underset{\|}{C}}-C_6H_{12}-\overset{O}{\underset{\|}{C}}-O(CH_2CH_2-O)_{\overline{2}}C_2H_5$ 22. $C_3H_7O(CH_2CH_2O)_{\overline{3}}\overset{O}{\underset{\|}{C}}-C_6H_{12}-\overset{O}{\underset{\|}{C}}-O(CH_2CH_2O)_{\overline{3}}C_3H_7$ 23. $CH_3O(CH_2CH_2O)_{\overline{3}}\overset{O}{\underset{\|}{C}}-C_6H_{12}-\overset{O}{\underset{\|}{C}}-O(CH_2CH_2O)_{\overline{3}}3-CH_3$ 24. $CH_3-\overset{CH_3}{\underset{\underset{OC_2H_5}{|}}{\overset{|}{C}}}-CH_2CH_2-O-\overset{O}{\underset{\|}{C}}-C_6H_{12}-\overset{O}{\underset{\|}{C}}-O-CH_2CH_2-\overset{CH_3}{\underset{\underset{OC_2H_5}{|}}{\overset{|}{C}}}-CH_3$ 25. $CH_3-\overset{}{\underset{\underset{OCH_3}{|}}{\overset{|}{CH}}}-CH_2CH_2-O-\overset{O}{\underset{\|}{C}}-C_6H_{12}-\overset{O}{\underset{\|}{C}}-O-CH_2CH_2-\overset{}{\underset{\underset{OCH_3}{|}}{\overset{|}{CH}}}-CH_3$ 26. $C_6H_{13}O-\overset{O}{\underset{\underset{O}{\|}}{C}}-C_6H_{12}-\overset{O}{\underset{\|}{C}}-O(CH_2CH_2O)_{\overline{2}}C_4H_9$ 27. $C_8H_{17}O-\overset{O}{\underset{\|}{C}}-C_6H_{12}-\overset{O}{\underset{\|}{C}}-O-CH_2CH_2-OC_4H_9$ 28. $C_3H_7O-CH_2CH_2-O-\overset{O}{\underset{\|}{C}}-C_8H_{16}-\overset{O}{\underset{\|}{C}}-O-CH_2CH_2-OC_3H_7$ 29. $C_4H_9O-CH_2CH_2-O-\overset{O}{\underset{\|}{C}}-C_8H_{16}-\overset{O}{\underset{\|}{C}}-O-CH_2-CH_2-OC_4H_9$ 30. $C_2H_5(OCH_2CH_2)_{\overline{2}}O-\overset{O}{\underset{\|}{C}}-C_8H_{16}-\overset{O}{\underset{\|}{C}}-O(CH_2CH_2-O)_{\overline{2}}C_2H_5$ 31. $C_4H_9(OCH_2CH_2)_{\overline{3}}O-\overset{O}{\underset{\|}{C}}-C_8H_{16}-\overset{O}{\underset{\|}{C}}-O(CH_2CH_2O)_{\overline{3}}C_4H_9$ 32. $CH_3-\overset{}{\underset{\underset{OCH_3}{|}}{\overset{|}{CH}}}-CH_2CH_2-O-\overset{O}{\underset{\|}{C}}-C_8H_{16}-\overset{O}{\underset{\|}{C}}-O-CH_2CH_2-\overset{}{\underset{\underset{OCH_3}{|}}{\overset{|}{CH}}}-CH_3$ 33. $CH_3-\overset{CH_3}{\underset{\underset{OCH_3}{|}}{\overset{|}{C}}}-CH_2CH_2-O-\overset{O}{\underset{\|}{C}}-C_8H_{16}-\overset{O}{\underset{\|}{C}}-O-CH_2CH_2-\overset{CH_3}{\underset{\underset{OCH_3}{|}}{\overset{|}{C}}}-CH_3$ 34. $C_6H_{13}-O-\overset{O}{\underset{\|}{C}}-C_8H_{16}-\overset{O}{\underset{\|}{C}}-O-CH_2CH_2-CH_2CH_2-OCH_3$

TABLE 1-continued

35. $C_8H_{17}-O-\overset{O}{\overset{\|}{C}}-C_8H_{16}-\overset{O}{\overset{\|}{C}}-O-(CH_2CH_2-O)_{\overline{n}}C_2H_5$ 36. $C_3H_7O-(CH_2CH_2O)_{\overline{n}}\overset{O}{\overset{\|}{C}}-C_4H_8-\overset{O}{\overset{\|}{C}}-O-C_8H_{17}$ 37. $CH_3-\underset{\underset{OCH_3}{|}}{\overset{\overset{CH_3}{|}}{C}}-CH_2CH_2-O-\overset{O}{\overset{\|}{C}}-C_4H_8-\overset{O}{\overset{\|}{C}}-O-C_8H_{17}$ 38. $C_2H_5O-(CH_2CH_2O)_{\overline{n}}-\overset{O}{\overset{\|}{C}}-C_8H_{16}-\overset{O}{\overset{\|}{C}}-O-C_6H_{13}$ 39. $CH_3-\underset{\underset{OCH_3}{|}}{CH}-CH_2CH_2-O-\overset{O}{\overset{\|}{C}}-C_8H_{16}-\overset{O}{\overset{\|}{C}}-O-C_8H_{17}$ 40. $C_2H_5-(OCH_2CH_2)_{\overline{n}}O-\overset{O}{\overset{\|}{C}}-CH_2-\overset{O}{\overset{\|}{C}}-O-(CH_2CH_2O)_{\overline{n}}C_2H_5$ 41. $CH_3-\underset{\underset{OCH_3}{|}}{\overset{\overset{CH_3}{|}}{C}}-CH_2CH_2-O-\overset{O}{\overset{\|}{C}}-CH_2-\overset{O}{\overset{\|}{C}}-O-CH_2CH_2-\underset{\underset{OCH_3}{|}}{\overset{\overset{CH_3}{|}}{C}}-CH_3$ 42. $C_3H_7-(OCH_2CH_2)_{\overline{n}}O-\overset{O}{\overset{\|}{C}}-C_3H_6-\overset{O}{\overset{\|}{C}}-O-(CH_2CH_2O)_{\overline{n}}C_3H_7$ 43. $CH_3-\underset{\underset{OCH_3}{|}}{\overset{\overset{CH_3}{|}}{C}}-CH_2CH_2-O-\overset{O}{\overset{\|}{C}}-C_3H_6-\overset{O}{\overset{\|}{C}}-O-CH_2CH_2-\underset{\underset{OOCH_3}{|}}{\overset{\overset{CH_3}{|}}{C}}-CH_3$ 44. $C_2H_5-(OCH_2CH_2)_{\overline{n}}O\overset{O}{\overset{\|}{C}}-C_5H_{10}-\overset{O}{\overset{\|}{C}}-O-(CH_2CH_2O)_{\overline{n}}C_2H_5$ 45. $CH_3-\underset{\underset{OCH_3}{|}}{\overset{\overset{H}{|}}{C}}-CH_2CH_2-O-\overset{O}{\overset{\|}{C}}-C_5H_{10}-\overset{O}{\overset{\|}{C}}-O-CH_2CH_2-\underset{\underset{OCH_3}{|}}{\overset{\overset{CH_3}{|}}{C}}-CH_3$ 46. $C_3H_7-(OCH_2CH_2)_{\overline{n}}O-\overset{O}{\overset{\|}{C}}-C_7H_{14}-\overset{O}{\overset{\|}{C}}-O-(CH_2CH_2O)_{\overline{n}}C_3H_7$ 47. $CH_3-\underset{\underset{OCH_3}{|}}{\overset{\overset{H}{|}}{C}}-CH_2CH_2-O-\overset{O}{\overset{\|}{C}}-C_7H_{14}-\overset{O}{\overset{\|}{C}}-O-CH_2CH_2\underset{\underset{OCH_3}{|}}{\overset{\overset{H}{|}}{C}}-CH_3$ tz,1/38

Among the plasticizers of the above general formula, those represented by the following general formula

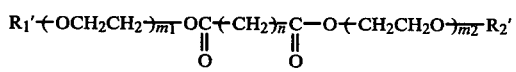

wherein $R'_1$ and $R'_2$ each represent an alkyl group having 1 to 8 carbon atoms, $m_1$ and $m_2$ each represent an integer of 2 to 4, and n represents an integer of 1 to 10 have good compatibility with the polyvinyl butyral satisfying the expression (1) and give laminated glasses having especially good stability at their edge portion. These plasticizers can be obtained by esterification of dicarboxylic acids iwth monoalkyl ethers such as triethylene glycol and tetraethylene glycol, and typical examples are compounds of formulae 2, 3, 8, 9, 10, 11, 20, 21, 22, 23, 30, 31, 40, 42, 44 and 46 given in Table 1.

The above plasticizers are used either singly or in suitable combinations with each other. The amount of the plasticizer is desirably 30 to 60 parts by weight per 100 parts by weight of polyvinyl butyral. If the amount of the plasticizer is less than 30 parts by weight, the resulting laminated glass has reduced penetration resistance. If, on the other hand, it exceeds 60 parts by weight, the plasticizer bleeds out on the surface of the resulting interlayer film and thus adversely affects the transparency and adhesion of the interlayer film for a laminated glass.

The impact strength of the resulting laminated glass can be increased further by incorporating additives such as nonionic surface-active agents, organic carboxylic acids, and metal salts of organic carboxylic acids in the plasticizers used in this invention.

Other suitable additives such as stabilizers for increasing weatherability and heat resistance, antioxidants and ultraviolet absorbers are fed usually to an extruder together with the polyvinyl butyral and the plasticizer. They are mixed and extrusion-molded into an interlayer film.

The T peel strength of the interlayer film at 20° C. is measured by the following procedure in accordance with 7. Procedure in the testing method for peel strength of adhesives in JIS K-6854. Two rectangular samples (usually having a size of 3 cm×10 cm) are cut out from an interlayer film having a smooth or embossed surface, and laid together. Under a suitable load (6 kg), the assembly is adjusted to a temperature of 20° C. by, for example, allowing it to stand in a desiccator. One end of this sample is delaminated, and the peeled portions are bent in a direction of 90° in a T-shape as a whole. The ends of the peeled portions are held by a tensile tester, and the peel strength is measured at 20° C. and a pulling speed of 500 mm/min.

The interlayer film of this invention has a T peel strength measured at 20° C. by the above method of not more than 0.5 kg/cm, preferably not more than 0.4 kg/cm, and usually 0.2 kg/cm or more. Since the interlayer film of this invention comprises a mixture of the polyvinyl butyral satisfying the expression (1) and the plasticizer and has a T peel strength of not more than 0.5 kg/cm, it does not adhere to itself during wind-up after film formation. It is unnecessary therefore to spray an adhesion-preventing agent on the surface of the interlayer film, refrigerate the interlayer film, or insert an adhesion-preventing film between layers of the interlayer film. The impact strength of a laminated glass produced by using the interlayer film of this invention is practical over a wide temperature range, and is especially improved at low temperatures.

One preferred embodiment of this invention is a wound or stacked structure of an interlayer sheet for a laminated glass, said sheet being prepared from a mixture of the polyvinyl butyral specified in this invention and the plasticizer and having fine raised and depressed portions on its surface, the sheet surface being in contact with itself without a powdery adhesion-preventing agent between layers of the sheet.

Usually, the mixture of the polyvinyl butyral and the plasticizer is fed into an extruder and extruded in sheet form, and thereafter, processed by a pair of embossing rolls to form fine raised and depressed portions on its surface. In order to obtain an interlayer film having more reduced self-adhering property, the roughness of the raised and depressed portions is preferably at least 15 microns, preferably at least 25 microns, most preferably at least 50 microns, in terms of 10-point average surface roughness.

Figure 2:
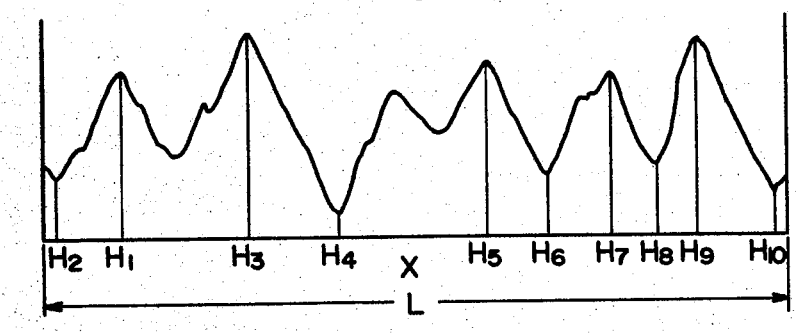

The 10-point average surface roughness, as used in this application, is the surface roughness measured in the following manner in accordance with ISO R 468. The raised and depressed pattern of the surface of a sample is determined by a suitable instrument to obtain a cross section curve as shown in FIG. 2. A portion of the curve defined by a standard length L is taken up. The balance between the average value of the five highest hills in this portion and the average value of the five deepest valleys is defined as the 10-point average surface roughness Hz. Let the heights of hills or the depths of valleys measured from the standard line X be Hi where i is an integer of 1 to 10, Hz is given by the following equation. The standard length L is taken as 8 mm.

$$Hz = \frac{(H_1 + H_3 + H_5 + H_7 + H_9) - (H_2 + H_4 + H_6 + H_8 + H_{10})}{5}$$

A die lip of an extruder may also be used to form fine raised and depressed portions on the surface of the interlayer film.

The interlayer film in accordance with this embodiment of the invention is obtained by winding the resulting extruded sheet having the fine raised and depressed portions over a length of 50 to 600 m on a paper or plastic core having an outside diameter of 7 to 30 cm and a length of 50 to 300 cm without spraying a powdery adhesion-preventing agent or inserting an adhesion-preventing film. Or it is cut to suitable lengths, and the cut sheets are stacked. Or the sheet is folded a number of times to form a stacked structure.

The resulting interlayer film is adjusted to a predetermined water content by a suitable means and packed in a plastic bag or the like for storage or transportation. From the viewpoint of the ease of handling, it is preferably in a wound form.

In the present invention, the ambient temperature means the temperature of an environment in which the interlayer film produced is stored or transported. Generally, it is not more than 50° C., preferably not more than 40° C.

The wound or stacked structure of the interlayer film of this invention can be stored or transported at such a temperature without substantial adhesion of the film to itself.

The expression that "the interlayer film does not substantially adhere to itself", as used in this application, means that peeling of a part of the interlayer in the stacked or wound structure from another part of it or the unwinding of the wound structure does not result in a change in the thickness of the film which may cause adverse effects on the quality of the film, nor in deformation or breakage which makes the film useless in practical applications.

In the production of a laminated glass, the interlayer film of this invention can be used without the need to remove a powdery adhesion-preventing agent by washing and to perform subsequent drying and moisture adjustment.

Since no powdery adhesion-preventing agent is interposed between layers of the interlayer film of this invention, it is quite unnecessary to perform a washing step for removal of the powdery adhesion-preventing agent and the subsequent drying and moisture adjusting steps. Furthermore, since no adhesion-preventing film is used, the interlayer film of the invention has the advantage of not attracting dirts owing to static charge generated by the adhesion-preventing film.

Furthermore, since the interlayer film of this invention needs not to be refrigerated, no refrigerating device is required after the production and during packing, transporting and storing and use. Hence, no water drops form on the film surface after it is taken out from the container, and thus no re-adjustment of moisture is necessary.

The following Examples illustrate the present invention more specifically. All parts and percentages are by weight unless otherwise specified.

The various properties in these examples were measured by the following methods.

1. Impact strength

A plasticizer was added to polyvinyl butyral and the mixture was kneaded and extruded by an extruder into a film of plasticized polyvinyl butyral having a thickness of 0.76 mm. The film was interposed between two sheets of glass each having a thickness of 3.0 mm and a size of 30 cm×30 cm. The assembly was consolidated for 15 minutes at 120° C. and 12 kg/cm$^2$ to form a laminated glass. The laminated glass was stored for more than 8 hours at a predetermined temperature. The laminated glass was then placed on a square shaped iron frame having a height of 20 cm with an outside frame measuring 31 cm×31 cm and an inside frame measuring 26 cm×26 cm, and steel balls each weighing 2.268 kg (5 pounds) were let fall onto the center of the laminated glass from a predetermined height. The height from which 50% of the dropped steel balls penetrated through the laminated glass was defined as the penetration resistance or strength of the laminated glass.

By using a plasticizer containing a suitable amount of a metal soap, the pummel value of the laminated glass sample was adjusted to 6 which is that of laminated glasses ordinarily in use.

2. Adhesion to glass

The laminated glass was left to stand at a temperature of −18° C.±0.6° C. for 16 hours, and then struck by a hammer with a head weight of 0.45 kg to pulverize it until the particle diameter of the glass particles was reduced to 6 mm or below. The degree of exposure of the interlayer film after the peeling of the glass is evaluated by comparison with a standard sample previously graded. The results are shown in terms of pummel values in Table 2.

TABLE 2

| Bare film layer (%) | Pummel value |
|---|---|
| 100 | 0 |
| 90 | 1 |
| 85 | 2 |
| 60 | 3 |
| 40 | 4 |
| 20 | 5 |
| 10 | 6 |
| 5 | 7 |
| less than 2 | 8 |

3. Self-adhering property (T peel strength)

The same interlayer film as used in the test for impact strength was hydraulically pressed for 3 minutes at 150° C. and 40 kg/cm$^2$ to prepare a film having a smooth surface and a thickness of 0.76 mm. The film was cut into rectangular pieces having a size of 3 cm×10 cm. Two such pieces were laid together and under a load of 6 kg, allowed to stand for 48 hours in a desiccator kept at a temperature of 20° C.

One end of the resulting sample was peeled and bent in a direction of 90° generally in a T-shape. The peeled ends were held by a tensile tester, and the T peel strength was measured at 20° C. and a pulling speed of 500 mm/min.

4. Self-adhering force of the interlayer film in a wound structure

Both ends of a hollow cylindrical core about which the interlayer film was wound were fixed to a frame through bearings so that when one end of the interlayer was pulled in the longitudinal direction, the core and the wound structure rotated as a unit. The wound structure was unwound at a rate of 10 m/min. on another core which was designed so as to rotate in interlocking relation with an unwinding motor. The load on the motor at this time was continuously recorded, and the highest force required to peel off the wound structure was defined as the self-adhering force.

5. Compatibility

One hundred grams of a plasticizer was added to 8 g of polyvinyl butyral, and the mixture was heated in an oil bath to 170° C. to form a solution. The solution was then cooled at a rate of 2° C./min. and a temperature at which a cloud formed was defined as the cloud point. Lower cloud points are measures of better compatibility between the polyvinyl butyral and the plasticizer.

6. Bleeding resistance

A sample, 5 cm×5 cm in size, was cut out from the interlayer film. The sample was stored for 5 days at 22° C. and a relative humidity of 100%. Bleeding of the plasticizer was visually tested. When there was no visible bleeding, it was justed that the sample had good bleeding resistance.

7. Test for the stability of an edge portion

A laminated glass, 30 cm×30 cm in size, produced from glass sheets each having a thickness of 3 mm and an interlayer film having a thickness of 0.76 mm was exposed outdoors at an angle of 45° to the horizontal plane at Minakuchi-cho, Shiga-ken, Japan.

(A) After the lapse of three months, the pummel value of the laminated glass was measured.

The adhesion of the central portion of the sample was compared with its edge portion extending 10 mm or less from its edge, and the result was evaluated on the following standards.

Δ: the pummel value of the edge portion was more than 4 lower than that of the central portion ○: the pummel value of the edge portion is 3 to 4 lower than that of the central portion ◎: the pummel value of the edge portion is less than 3 lower than that of the central portion (B) After exposure for one year, the appearance of the edge portion of the sample was observed. When foaming, peeling or other changes were not observed at the edge portion of the sample, it was judged that the stability of the edge portion was good.

8. Half-value width of hydroxyl groups

One gram of polyvinyl butyral was dissolved in a mixed solvent consisting of 10 cc of butanol and 15 cc of ethanol. The solution was cast on a mirror surface and dried by a vacuum dryer at 60° C. for 3 hours to form a polyvinyl butyral film. The infrared absorption spectrum of the film was measured by an EPI-G$_3$ diffraction lattice infrared spectrophotometer made by Hitachi Limited. The half-value width of hydroxyl groups was determined on the basis of FIG. 1 in accordance with the definition of the half-value width in this invention.

EXAMPLE 1

One hundred kilograms of polyvinyl alcohol having a saponification degree of 99.2 mole% and a degree of polymerization of 2,200 was completely dissolved in 880 kg of distilled water, and 57 kg of concentrated hydrochloric acid and 25 kg of sodium perchlorate were added. The mixture was maintained at 14.4° C., and 51.9 kg of butyraldehyde was added dropwise over the course of 15 minutes. In 10 minutes after the addition, a precipitate of polyvinyl butyral was obtained. The reaction system was heated and maintained for 10 hours at an aging temperature of 40° C. The temperature was then lowered, and the product was neutralized with sodium bicarbonate. The resulting polyvinyl butyral was washed with water and dried. It was found to have a degree of butyralization of 62.5 mole%. The infrared absorption spectrum of the resulting polyvinyl butyral was measured, and the half-value width of hydroxyl groups was found to be 322 cm$^{-1}$. The value of $-3X+486$ was 298.5 which was within the definition of the expression (1).

EXAMPLES 2 TO 4

An aqueous polyvinyl alcohol solution containing a hydrochloric acid catalyst and 25 kg of 60% sodium perchlorate was maintained at 14.4° C., and butyraldehyde was added to form a precipitate. The reaction system was then heated and maintained at a high temperature for a long period of time, and thereafter subjected in a customary manner to neutralization, washing with water and drying to obtain a white powder of polyvinyl butyral.

The manufacturing conditions for polyvinyl butyral and the degree of butyralization of the resulting polyvinyl butyral and the half-value width of hydroxyl absorption are shown in Table 3 together with those in Example 1.

COMPARATIVE EXAMPLES 1 TO 4

An aqueous polyvinyl alcohol solution containing a hydrochloric acid catalyst was maintained at 14.4° C., and butyraldehyde was added to form a precipitate. Then, the reaction system was heated, and maintained at 30° to 40° C. for 4 to 8 hours and thereafter subjected in a customary manner to neutralization, washing with water and drying to give a white powder of polyvinyl butyral.

The manufacturing conditions for polyvinyl butyral, the degree of butyralization of the resulting polyvinyl butyral and the half-value width of hydroxyl absorption are shown in Table 3.

TABLE 3

| | | Polyvinyl alcohol | | Polyvinyl butyral | | | | |
| --- | --- | --- | --- | --- | --- | --- | --- | --- |
| | Resin (**) | Degree of polymer- ization | Degree of sa- ponifi- cation (mole %) | Aging temper- ature (°C.) | Aging of time (hours) (*) | Degree of butyral- ization (mole %) | Half- value width (cm$^{-1}$) | $-3x -486$ |
| Example | | | | | | | | |
| 1 | A | 2200 | 99.2 | 40 | 10 | 62.5 | 322 | 298.5 |
| 2 | B | " | " | 50 | 4 | 63.0 | 321.2 | 297 |
| 3 | C | " | " | 60 | 3 | 66.1 | 314.1 | 287.7 |
| 4 | D | " | " | 70 | 3 | 69.2 | 288.2 | 278.4 |
| Comparative Example | | | | | | | | |
| 1 | a | 2200 | 99.2 | 30 | 4 | 62.4 | 283 | 298.4 |
| 2 | b | " | " | 40 | 4 | 63.0 | 282.1 | 297.0 |
| 3 | c | " | " | 40 | 5 | 66.1 | 270.1 | 287.7 |
| 4 | d | " | " | 40 | 3 | 69.2 | 252.4 | 278.4 |

(*): The time during which the reaction system was maintained at the aging temperature.
(**): The polyvinyl butyrals obtained in Examples 1, 2, 3 and 4 are respectively designated resins A, B, C and D, and those obtained in Comparative Examples 1, 2, 3 and 4, resins a, b, c and d.

EXAMPLES 1-1 TO 1-4, 2-1 TO 2-4, 3-1 TO 3-11 AND 4-1 TO 4-3

Interlayer films were produced from 100 parts of each of resins A, B, C and D and 40 parts of a plasticizer, and laminated glasses were produced by using these interlayer films. The selfadhering properties (T peel strengths) of the interlayer films, and the impact strengths of the laminated glasses were measured, and are shown in Table 4. The compatibility between the interlayer film and the plasticizer, the bleeding resistance of the interlayer film, and the stability of the edge portion of the laminated glass are shown in Table 5.

TABLE 4

| Ex- ample | Resin (100 parts) | Plasticizer (40 parts) (*) | Self-adhering property (T peel strength, kg/cm) | Impact strength (falling ball height, meters) (**) | | | |
| --- | --- | --- | --- | --- | --- | --- | --- |
| | | | | $-20°$ C. | $0°$ C. | $20°$ C. | $40°$ C. |
| 1-1 | A | 1 | 0.28 | 2.3 | 5.2 | 6.0 | 4.2 |
| 1-2 | A | 9 | 0.27 | 2.4 | 5.1 | 5.9 | 4.0 |
| 1-3 | A | 10 | 0.31 | 2.2 | 4.9 | 5.8 | 4.2 |
| 1-4 | A | 3GH | 0.21 | 2.3 | 5.2 | 6.0 | 4.2 |
| 2-1 | B | 1 | 0.19 | 2.3 | 5.1 | 6.0 | 4.3 |
| 2-2 | B | 9 | 0.22 | 2.5 | 5.5 | 6.2 | 4.4 |
| 2-3 | B | 10 | 0.21 | 2.9 | 5.5 | 6.3 | 4.1 |
| 2-4 | B | 3GH | 0.30 | 2.8 | 5.3 | 6.1 | 4.1 |
| 3-1 | C | 1 | 0.28 | 2.8 | 5.2 | 6.0 | 4.1 |
| 3-2 | C | 6 | 0.27 | 2.6 | 5.2 | 6.0 | 4.4 |
| 3-3 | C | 11 | 0.29 | 4.1 | 5.5 | 6.3 | 4.0 |

TABLE 4-continued

| Ex-ample | Resin (100 parts) | Plasticizer (40 parts) (*) | Self-adhering property (T peel strength, kg/cm) | Impact strength (falling ball height, meters) (**) | | | |
|---|---|---|---|---|---|---|---|
| | | | | −20° C. | 0° C. | 20° C. | 40° C. |
| 3-4 | C | 3 | 0.26 | 4.2 | 5.1 | 6.2 | 4.1 |
| 3-5 | C | 12 | 0.24 | 3.8 | 5.2 | 6.3 | 4.0 |
| 3-6 | C | 28 | 0.23 | 3.7 | 5.2 | 6.2 | 4.4 |
| 3-7 | C | 31 | 0.29 | 4.3 | 5.6 | 6.2 | 4.1 |
| 3-8 | C | 15 (20 parts), 16 (20 parts) | 0.31 | 3.9 | 5.1 | 6.0 | 4.1 |
| 3-9 | C | 32 (20 parts), 34 (20 parts) | 0.30 | 3.3 | 5.2 | 6.1 | 4.5 |
| 3-10 | C | 8 (10 parts), 16 (10 parts) 36 (20 parts) | 0.30 | 3.7 | 5.2 | 6.3 | 4.4 |
| 3-11 | C | 3GH | 0.35 | 3.9 | 5.4 | 5.9 | 3.8 |
| 4-1 | D | 4 | 0.36 | 4.1 | 5.2 | 6.4 | 3.9 |
| 4-2 | D | 9 | 0.34 | 4.2 | 5.5 | 6.0 | 4.0 |
| 4-3 | D | 24 (20 parts), 27 (20 parts) | 0.37 | 4.4 | 5.2 | 6.1 | 4.1 |

(*): 1 shows that 40 parts of the plasticizer No. 1 in Table 1 was used; 3GH stands for triethylene glycol di-2-ethyl butyrate; and 15 (20 parts) and 16 (20 parts) show that 20 parts of the plasticizers Nos. 15 and 16 in Table 1 were used.
(**): Samples having a pummel value preset at 6 by using interlayer films containing a suitable amount of the same metal soap were used.

TABLE 5

| Ex-ample | Resin (100 parts) | Plasticizer (40 parts)* | Compatibility (cloud point, °C.) | Bleeding resistance | Edge stability | |
|---|---|---|---|---|---|---|
| | | | | | (A) After 3 month exposure | (B) After one year exposure |
| 1-1 | A | 1 | 128 | Good | ○ | Good |
| 1-2 | A | 9 | 108 | " | ⊚ | " |
| 1-3 | A | 10 | 111 | " | ⊚ | " |
| 1-4 | A | 3GH | above 170 | Bleeding occurred | △ ○ | Edge peeled |
| 2-1 | B | 1 | 122 | Good | ⊚ | Good |
| 2-2 | B | 9 | 117 | " | ⊚ | " |
| 2-3 | B | 10 | 98 | " | ○ | " |
| 3-1 | C | 1 | 129 | " | ○ | " |
| 3-2 | C | 6 | 102 | " | ⊚ | " |
| 3-3 | C | 11 | 96 | " | ⊚ | " |
| 3-4 | C | 3 | 127 | " | ○ | " |
| 3-5 | C | 12 | 122 | " | ○ | " |
| 3-6 | C | 28 | 129 | " | ⊚ | " |
| 3-7 | C | 31 | 99 | " | ○ | " |
| 3-8 | C | 15 (20 parts), 16 (20 parts) | 128 | " | ○ | " |
| 3-9 | C | 32 (20 parts), 34 (20 parts) | 111 | " | ○ | " |
| 3-10 | C | 8 (10 parts), 16 (10 parts) 36 (20 parts) | 115 | " | ○ | " |
| 3-11 | C | 3GH | 162 | Bleeding occurred | △ | Edge foamed |
| 4-1 | D | 4 | 98 | Good | ○ | Good |
| 4-2 | D | 9 | 102 | " | ⊚ | " |
| 4-3 | D | 24 (20 parts), 27 (20 parts) | 126 | " | ○ | " |

*The same as the footnote to Table 4.

COMPARATIVE EXAMPLES 1-1 TO 1-4, 2-1 TO 2-4, 3-1 TO 3-11 AND 4-1 TO 4-3

The self-adhering properties of interlayer films produced from 100 parts of each of the resins a, b, c and d obtained in Comparative Examples 1 to 4 and the impact strengths of laminated glasses obtained by using these interlayer films were measured, and are shown in Table 6.

TABLE 6

| Comparative Ex-ample | Resin (100 parts) | Plasticizer (40 parts) (*) | Self-adhering property (T peel strength, kg/cm) | Impact strength (ball falling height, meters) (**) | | | |
|---|---|---|---|---|---|---|---|
| | | | | −20° C. | 0° C. | 20° C. | 40° C. |
| 1-1 | a | 1 | 1.44 | 1.9 | 4.6 | 5.2 | 3.0 |
| 1-2 | a | 9 | 1.35 | 2.2 | 4.5 | 5.9 | 3.3 |
| 1-3 | a | 10 | 1.26 | 2.2 | 4.9 | 5.7 | 2.9 |
| 1-4 | a | 3GH | 1.12 | 2.0 | 4.8 | 5.9 | 3.2 |
| 2-1 | b | 1 | 1.12 | 1.8 | 4.7 | 5.7 | 3.0 |
| 2-2 | b | 9 | 1.24 | 1.7 | 4.6 | 5.9 | 3.1 |
| 2-3 | b | 10 | 1.22 | 2.2 | 4.4 | 6.0 | 3.2 |
| 2-4 | b | 3GH | 1.44 | 2.4 | 5.0 | 6.0 | 3.1 |
| 3-1 | c | 1 | 1.76 | 2.2 | 4.8 | 5.7 | 2.8 |
| 3-2 | c | 6 | 1.48 | 2.2 | 4.7 | 5.7 | 2.7 |
| 3-3 | c | 11 | 1.62 | 2.2 | 4.8 | 5.8 | 2.5 |
| 3-4 | c | 3 | 1.58 | 2.0 | 4.8 | 5.9 | 2.7 |
| 3-5 | c | 12 | 1.63 | 2.2 | 4.9 | 5.8 | 2.6 |
| 3-6 | c | 28 | 1.48 | 2.2 | 5.1 | 5.9 | 2.9 |
| 3-7 | c | 31 | 1.49 | 2.2 | 5.1 | 5.8 | 2.8 |

TABLE 6-continued

| Comparative Example | Resin (100 parts) | Plasticizer (40 parts) (*) | Self-adhering property (T peel strength, kg/cm) | Impact strength (ball falling height, meters) (**) | | | |
| --- | --- | --- | --- | --- | --- | --- | --- |
| | | | | −20° C. | 0° C. | 20° C. | 40° C. |
| 3-8 | c | 15 (20 parts), 16 (20 parts) | 1.32 | 2.3 | 5.0 | 6.0 | 2.8 |
| 3-9 | c | 32 (20 parts), 34 (20 parts) | 1.56 | 1.9 | 4.2 | 5.8 | 3.1 |
| 3-10 | c | 8 (10 parts), 16 (10 parts) 36 (20 parts) | 1.66 | 1.9 | 4.4 | 5.0 | 3.1 |
| 3-11 | c | 3GH | 2.15 | 2.5 | 5.2 | 5.0 | 2.9 |
| 4-1 | d | 4 | 2.24 | 2.4 | 5.0 | 5.0 | 2.8 |
| 4-2 | d | 9 | 2.31 | 2.4 | 5.0 | 5.0 | 2.9 |
| 4-3 | d | 24 (20 parts), 27 (20 parts) | 2.47 | 2.2 | 4.8 | 5.8 | 2.7 |

(*) and (**): The same as the footnote to Table 4.

The following Examples illustrates the wound structure of the interlayer of this invention.

EXAMPLE 5

Sixty kilograms of triethylene glycol di-2-ethylbutyrate (to be abbreviated 3GH) was added to 150 kg of the resin A obtained in Example 1. The mixture was extruded by an extruder into a sheet having a width of 150 cm, and then passed through a pair of embossing rolls to form fine embossed patterns on its both surfaces which had a 10-point average surface roughness of 40 microns. About 150 m of the embossed interlayer sheet was wound on a paper tube having an outside diameter of 10 cm to form a wound structure with a diameter of 60 cm which was packed in a polyethylene film and stored at 32° C. for 40 days.

The resulting wound structure had a self-adhering force of 6 kg, and its end portion could be easily peeled off by a human power.

The sheet was interposed between two sheets of glass each having a thickness of 3.0 mm and a size of 30 cm×30 cm, and the assembly was consolidated at a temperature of 120° C. and a pressure of 12 kg/cm for 15 minutes. Foaming or other undesired phenomenon was not observed at this time.

The water content of this sample was 0.4% which was the same as that before sealing.

EXAMPLES 6 TO 12

In each run, a wound structure of an interlayer film was prepared in the same way as in Example 5 from 100 parts of each of the resins A, B, C and D obtained in Examples 1 to 4 and 40 parts of each of the plasticizers shown in Table 7, and a laminated glass was produced from the interlayer film. The surface roughness and self-adhering force of each of the products and the presence or absence of bubbles in the laminated glass are shown in Table 7 together with those in Example 5.

COMPARATIVE EXAMPLES 5 TO 12

In each run, a wound structure of an interlayer film was produced in the same way as in Example 5 from 100 parts of each of the resins a, b, c and d obtained in Comparative Examples 1 to 4 and 40 parts of each of the plasticizers shown in Table 8, and a laminated glass was produced by using the wound structure of an interlayer film, in the same way as in Example 5. When it was attempted to measure the self-adhering forces of these interlayer films, the adhesion of these films to themselves was so strong that all of the films were broken as shown in Table 8.

TABLE 8

| Comparative Example | Resin | Plasticizer | Surface roughness (microns) | Self-adhering force |
| --- | --- | --- | --- | --- |
| 5 | a | 3GH | 35 | The film was broken. |
| 6 | a | No. 1 of Table 1 | 33 | The film was broken. |
| 7 | b | 3GH | 38 | The film was broken. |
| 8 | b | No. 1 of Table 1 | 48 | The film was broken. |
| 9 | c | 3GH | 35 | The film was broken. |
| 10 | c | No. 1 of Table 1 | 35 | The film was broken. |
| 11 | d | 3GH | 40 | The film was broken. |
| 12 | d | No. 1 of Table 1 | 40 | The film was broken. |

COMPARATIVE EXAMPLE 13

The wound structure of the interlayer film obtained in Comparative Example 5 was stored at 5° C. for 40 days after packing, and then left to stand at room temperature. Water droplets formed on the surface of the film. After the water droplets were removed, the interlayer film was used in producing a laminated glass in the

TABLE 7

| Example | Resin | Plasticizer | Surface roughness (microns) | Self-adhering force (kg) | Water content (%) | Bubbles in the glass |
| --- | --- | --- | --- | --- | --- | --- |
| 5 | A | 3GH | 40 | 6 | 0.4 | No |
| 6 | A | No. 10 of Table 1 | 40 | 6.2 | 0.4 | No |
| 7 | B | 3GH | 35 | 7.8 | 0.4 | No |
| 8 | B | No. 10 of Table 1 | 35 | 8.0 | 0.4 | No |
| 9 | C | 3GH | 35 | 12.2 | 0.4 | No |
| 10 | C | No. 10 of Table 1 | 35 | 12.0 | 0.4 | No |
| 11 | D | 3GH | 45 | 14.2 | 0.4 | No |
| 12 | D | No. 10 of Table 1 | 45 | 14.5 | 0.4 | No | same way as in Example 5 without performing moisture adjustment. Air bubbles formed in the laminated glass. The interlayer film at this time had a water content of 1.25%.

COMPARATIVE EXAMPLE 14

A wound structure of an interlayer film was produced in the same way as in Comparative Example 5 except that the wound structure was stored at 20° C. for 15 days. The interlayer film was tested for its self-adhering force, but was broken because of the marked adhesion of the film to itself.

EXAMPLES 13 TO 20

Interlayer films were produced in the same way as in Examples 5 to 12 except that they had a 10-point average roughness of less than 15 microns. The self-adhering forces and other properties of the interlayer films were measured, and the results are shown in Table 9.

TABLE 9

| Example | Resin | Plasticizer | Surface roughness (microns) | Self-adhering force (kg) | Water content (%) | Bubbles in the glass |
|---|---|---|---|---|---|---|
| 13 | A | 3GH | 12 | 22 | 0.4 | No |
| 14 | A | No. 10 of Table 1 | 12 | 23 | 0.4 | No |
| 15 | B | 3GH | 12 | 28 | 0.4 | No |
| 16 | B | No. 10 of Table 1 | 12 | 29 | 0.4 | No |
| 17 | C | 3GH | 12 | 33 | 0.4 | No |
| 18 | C | No. 10 of Table 1 | 13 | 37 | 0.4 | No |
| 19 | D | 3GH | 13 | 40 | 0.4 | No |
| 20 | D | No. 10 of Table 1 | 13 | 42 | 0.4 | No |

The self-adhering properties (T peel strengths) of the interlayers obtained in Examples 9, 12 and 20 were measured, and the results are shown in Table 20.

TABLE 10

| Example | 9 | 12 | 20 |
|---|---|---|---|
| T peel strength (Kg/cm) | 0.021 | 0.024 | 0.075 |
| Surface roughness (microns) | 35 | 45 | 13 |

EXAMPLES 21 TO 28

Wound structures of interlayer films were produced in the same way as in Examples 5 to 12 except that they were stored at 20° C. for 12 months. In Examples 21 and 22 which correspond to Examples 5 and 6, the surface roughness was changed from 40 microns to 20 microns. The self-adhering forces and other properties of the resulting interlayers were measured. The results are shown in Table 11.

TABLE 11

| Example | Resin | Plasticizer | Surface roughness (microns) | Self-adhering force (kg) | Water content (%) | Bubbles in the glass |
|---|---|---|---|---|---|---|
| 21 | A | 3GH | 20 | 5.5 | 0.4 | No |
| 22 | A | No. 10 of Table 1 | 20 | 5.7 | 0.4 | No |
| 23 | B | 3GH | 35 | 5.0 | 0.4 | No |
| 24 | B | No. 10 of Table 1 | 35 | 5.1 | 0.4 | No |
| 25 | C | 3GH | 35 | 6.6 | 0.4 | No |
| 26 | C | No. 10 of Table 1 | 35 | 6.6 | 0.4 | No |
| 27 | D | 3GH | 45 | 8.5 | 0.4 | No |
| 28 | D | No. 10 of Table 1 | 45 | 8.7 | 0.4 | No |

EXAMPLES 29 TO 36

Wound structures of interlayer films were obtained in the same way as in Examples 5 to 12 except that the wound structures were stored at 40° C. for 30 days. In Examples 35 and 36 which correspond to Examples 11 and 12, the surface roughness was changed from 45 microns to 55 microns. The self-adhering forces and other properties of the interlayer films were measured, and the results are shown in Table 12.

TABLE 12

| Example | Resin | Plasticizer | Surface roughness (microns) | Self-adhering force (kg) | Water content (%) | Bubbles in the glass |
|---|---|---|---|---|---|---|
| 29 | A | 3GH | 40 | 10.1 | 0.4 | No |
| 30 | A | No. 10 of Table 1 | 40 | 10.5 | 0.4 | No |
| 31 | B | 3GH | 35 | 11.6 | 0.4 | No |
| 32 | B | No. 10 of Table 1 | 35 | 11.6 | 0.4 | No |
| 33 | C | 3GH | 35 | 14.3 | 0.4 | No |
| 34 | C | No. 10 of Table 1 | 35 | 14.1 | 0.4 | No |
| 35 | D | 3GH | 55 | 13.5 | 0.4 | No |
| 36 | D | No. 10 of Table 1 | 55 | 13.5 | 0.4 | No |

EXAMPLES 37 TO 57

Interlayer films were produced in the same way as in Example 5 from 100 parts of each of the resins A, B, C and D and each of the plasticizers shown in Table 13. The compatibility, bleeding resistance, and edge stability of the interlayers were measured, and the results are shown in Table 13.

TABLE 13

| Example | Resin | Plasticizer (40 parts)* °C.) | Compatibility (cloud point, resistance) | Bleeding exposure | Edge stability (A) After 3 months exposure | (B) After one year |
|---|---|---|---|---|---|---|
| 37 | A | 1 | 128 | Good | ○ | Good |
| 38 | A | 9 | 108 | " | ◉ | " |
| 39 | A | 10 | 111 | " | ◉ | " |
| 40 | A | 3GH | above 170 | Bleeding occurred | △ | Edge peeled |
| 41 | B | 1 | 122 | Good | ○ | Good |
| 42 | B | 9 | 117 | " | ◉ | " |
| 43 | B | 10 | 98 | " | ◉ | " |
| 44 | C | 1 | 129 | " | ○ | " |
| 45 | C | 6 | 102 | " | ○ | " |
| 46 | C | 11 | 96 | " | ◉ | " |
| 47 | C | 3 | 127 | " | ◉ | " |
| 48 | C | 12 | 122 | " | ○ | " |
| 49 | C | 28 | 129 | " | ○ | " |
| 50 | C | 31 | 99 | " | ◉ | " |
| 51 | C | 15 (20 parts), 16 (20 parts) | 128 | " | ○ | " |
| 52 | C | 32 (20 parts), 34 (20 parts) | 111 | " | ○ | " |
| 53 | C | 8 (10 parts), 16 (10 parts) 36 (20 parts) | 115 | " | ○ | " |
| 54 | C | 3GH | 162 | Bleeding occurred | △ | Edge foamed |
| 55 | D | 4 | 98 | Good | ○ | Good |
| 56 | D | 9 | 102 | " | ◉ | " |
| 57 | D | 24 (20 parts), 27 (20 parts) | 126 | " | ○ | " |

*The same as the footnote to Table 4.

What we claim is:

1. A wound or a stacked interlayer film for a laminated glass, which comprises polyvinyl butyral and a plasticizer and which film as measured with a smooth surface has a peel strength at 20° C. of not more than 0.5 kg/cm, said polyvinyl butyral satisfying the following expression $$Y \geq -3X + 486$$

wherein X is the degree of butyralization in mole % and Y is the half-value width in cm$^{-1}$ of hydroxyl adsorption in the infrared absorption spectrum of the polyvinyl butyral in which the ordinate represents the transmittance and the abscissa represents the wave number, said interlayer film having fine raised and depressed portions formed on the surface thereof and which interlayer film is wound or stacked without spraying a powdery adhesion preventing agent thereupon so that the surface of the film makes contact with itself.

2. The interlayer film of claim 1 wherein the plasticizer is a compound of the general formula

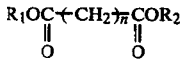

wherein $R_1$ represents an alcohol residue containing at least one ether linkage or an alkyl group having 5 to 13 carbon atoms, $R_2$ represents an alcohol residue containing at least one ether linkage, and n is an integer of 1 to 10.

3. The interlayer film of claim 2 wherein the plasticizer is a compound of the general formula

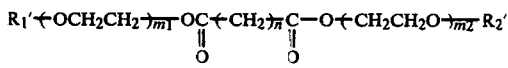

wherein $R'_1$ and $R'_2$ each represent an alkyl group having 1 to 8 carbon atoms, $m_1$ and $m_2$ each represent an integer of 2 to 4, and n represents an integer of 1 to 10.

4. The interlayer film of any one of claims 2 or 3 wherein the degree of butyralization of the polyvinyl butyral is 60 to 75 mole%.

5. The interlayer film of any one of claims 2 or 3 wherein the amount of the plasticizer is 30 to 60 parts by weight per 100 parts by weight of the polyvinyl butyral.

6. The interlayer film of any one of claims 2 or 3 wherein the polyvinyl butyral has an average degree of polymerization of 1,000 to 3,000.

7. The interlayer film of claim 1 wherein the fine raised and depressed portions have a 10-point average surface roughness of at least 15 microns.

8. The interlayer film of claim 7 wherein the fine raised and depressed portions have a 10-point average surface roughness of at least 25 microns.

* * * * *